(12) United States Patent
Jung et al.

(10) Patent No.: US 8,331,259 B2
(45) Date of Patent: Dec. 11, 2012

(54) APPARATUS AND METHOD FOR ADAPTIVELY GENERATING CHANNEL QUALITY INDICATOR IN WIRELESS COMMUNICATION SYSTEM

(75) Inventors: Young-Seok Jung, Suwon-si (KR); Jong-Han Lim, Seoul (KR); Sung-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 12/850,012

(22) Filed: Aug. 4, 2010

(65) Prior Publication Data

US 2011/0044186 A1    Feb. 24, 2011

(30) Foreign Application Priority Data

Aug. 19, 2009 (KR) .................. 10-2009-0076818

(51) Int. Cl.
H04L 12/26 (2006.01)
(52) U.S. Cl. ........ 370/252; 370/329; 370/328; 370/332; 375/224; 375/267; 375/227
(58) Field of Classification Search ............... 370/252, 370/328, 329, 332; 375/224, 267, 227, 260, 375/340
See application file for complete search history.

(56) References Cited

U.S. PATENT DOCUMENTS

| | | | |
|---|---|---|---|
| 7,821,982 B2 * | 10/2010 | Chen et al. | 370/328 |
| 8,144,797 B2 * | 3/2012 | Mujtaba et al. | 375/267 |
| 2007/0201350 A1 * | 8/2007 | Papasakellariou | 370/208 |
| 2009/0161613 A1 * | 6/2009 | Kent et al. | 370/329 |
| 2009/0323792 A1 * | 12/2009 | Zhou et al. | 375/224 |
| 2010/0309793 A1 * | 12/2010 | Choi et al. | 370/252 |

* cited by examiner

*Primary Examiner* — Ricky Ngo
*Assistant Examiner* — Rasheed Gidado
(74) *Attorney, Agent, or Firm* — Jefferson IP Law, LLP (57) ABSTRACT

An apparatus and method for generating a Channel Quality Indicator (CQI) in a wireless communication system are provided. The method includes receiving a Modulation and Coding Scheme (MCS) index and resource allocation information of a traffic channel and calculating a spectral efficiency at a particular time point, determining a temporary CQI index having a spectral efficiency closest to the calculated spectral efficiency in an index set, reading a CQI metric a time $\tau$ before the particular time point, determining, if the temporary CQI index is reported at the particular time point, an error rate based on the CQI metric, the error rate being a probability of an error occurring in a traffic channel after the time $\tau$, receiving an error check result of the traffic channel transmitted at the particular time point and calculating a new error rate by applying a weight to the error check result and the error rate, and determining a CQI index to be fed back to a transmitter using the new error rate. Hence, the CQI index which maximizes spectral efficiency is determined and a Physical Downlink Shared CHannel (PDSCH) acknowledgement (ACK)/ negative acknowledgement (NACK) probability is directly estimated adaptively according to a change in channel, thereby providing useful performance in various channel environments.

24 Claims, 6 Drawing Sheets

APPARATUS AND METHOD FOR ADAPTIVELY GENERATING CHANNEL QUALITY INDICATOR IN WIRELESS COMMUNICATION SYSTEM

PRIORITY

This application claims the benefit under 35 U.S.C. §119(a) of a Korean patent application filed in the Korean Intellectual Property Office on Aug. 19, 2009 and assigned Serial No. 10-2009-0076818, the entire disclosure of which is hereby incorporated by reference.

BACKGROUND OF THE INVENTION

1. Field of the Invention

The present invention relates to a method and apparatus for generating a Channel Quality Indicator (CQI) in a wireless communication system. More particularly, the present invention relates to a method and apparatus for generating a CQI in a wireless communication system to which Adaptive Modulation and Coding (AMC) is applied.

2. Description of the Related Art

Generally, wireless communication systems use an AMC scheme which improves spectral efficiency by adaptively changing a modulation order and an error correction code according to the quality of a channel between a transmitting end and a receiving end. That is, the AMC scheme is used to achieve maximum throughput with a given frequency band. To use the AMC scheme, a CQI estimated at the receiving end needs to be fed back to the transmitting end.

In recent communication systems, Hybrid Automatic Repeat Request (HARQ) as well as AMC is generally used and both of them are used in the $3^{rd}$ Generation Partnership Project Long Term Evolution (3GPP LTE) standard. The HARQ scheme retransmits only a transport block in which an error is found during initial transmission, thereby reducing a final error rate of the transport block and thus enhancing spectral efficiency.

The following description regarding the related art will be made based on the 3GPP LTE standard, and assumes the use of a spatial multiplexing Multiple Input Multiple Output (MIMO) communication system to which the AMC scheme is applied.

Figure 1:
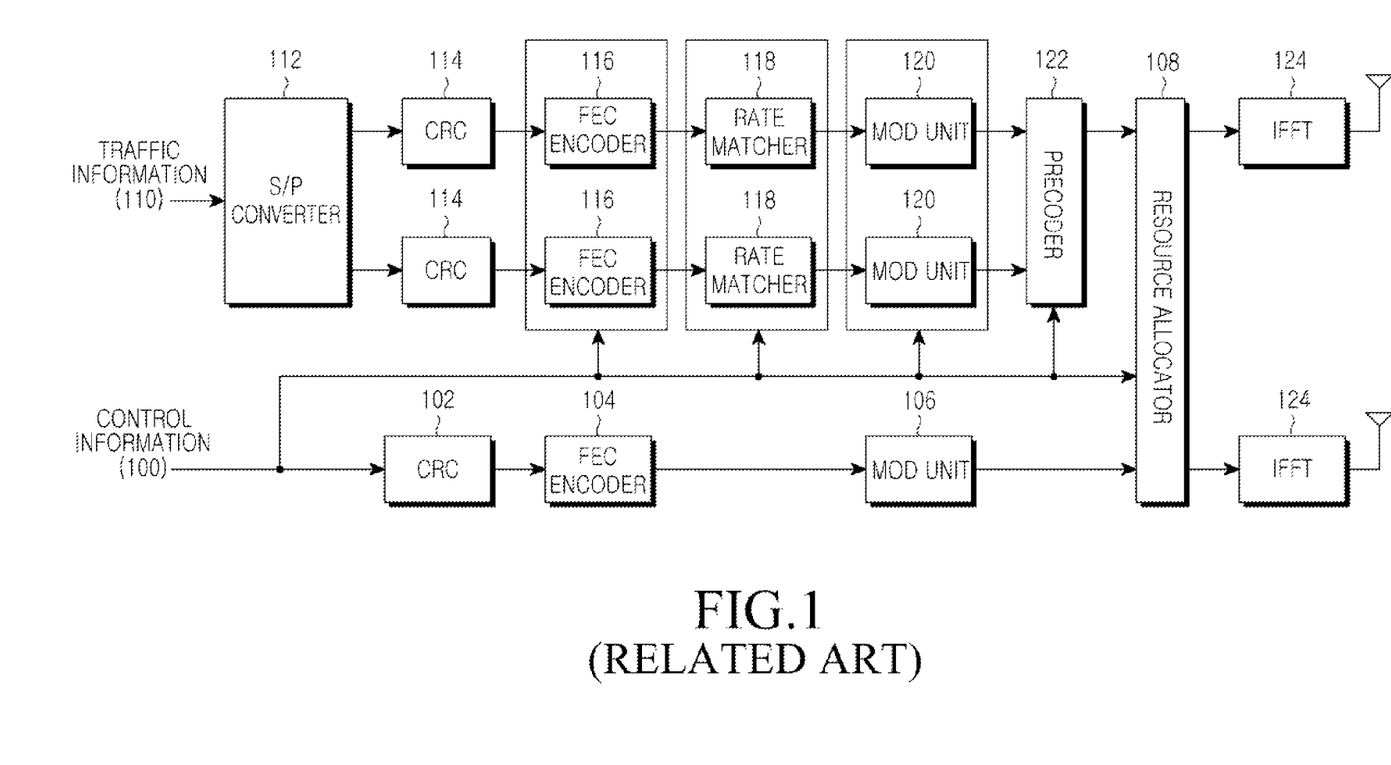
FIG. 1 is a block diagram showing a structure of a transmitter in a Multiple Input Multiple Output (MIMO) system to which an Adaptive Modulation and Coding (AMC) is applied according to the related art.

FIG. 1 is a block diagram showing a structure of a transmitter of an LTE-based MIMO system to which AMC is applied according to the related art.

First, a transmitting flow of control information 100 will be described.

The control information 100 includes Modulation and Coding Scheme (MCS) information and traffic channel resource allocation information which are determined for the AMC for each transport block for transmission of a traffic channel, the number of transport layers, precoding matrix index information, and so forth. To the control information 100 is added a Cyclic Redundancy Check (CRC) 102 which is an error detection scheme for detecting an error occurring during transmission. The control information 100 is encoded at a Forward Error Correction (FEC) encoder 104 using an FEC code which is an error correction code for correcting an error caused by noise. The encoded information bits are mapped to signal constellations at a Modulation (MOD) unit 106 and then delivered to a resource allocator 108. An interleaver may exist between the FEC encoder 104 and the MOD unit 106, though not shown in FIG. 1.

A description will now be made of a transmitting flow of traffic information 110.

The traffic information 110 is divided into transport blocks at a Serial-to-Parallel (S/P) converter 112. A transport block is a unit to which MCS is applied. To the divided traffic information is added a CRC 114 which is an error detection scheme for detecting an error occurring during transmission. The CRC-added traffic information is channel-encoded at an FEC encoder 116 using an FEC code which is an error correction code for correcting an error caused by noise. The channel encoding is performed based on the determined MCS information, and thus channel-encoded bits are output. Since the number of channel-encoded bits is generally not matched to the number of modulation symbols allocated to each user, it is matched to a proper one at a rate matcher 118 using the determined MCS information and the traffic channel resource allocation information. A modulation (MOD) unit 120 maps the rate-matched bits to signal constellations. A precoder 122 precodes output symbols of the MOD unit 120 using feedback information such as a CQI. An Inverse Fast Fourier Transform (IFFT) unit 124 transforms the precoded information from a frequency domain to a time domain, and delivers it to a Radio Frequency (RF) converter (not shown).

Figure 2:
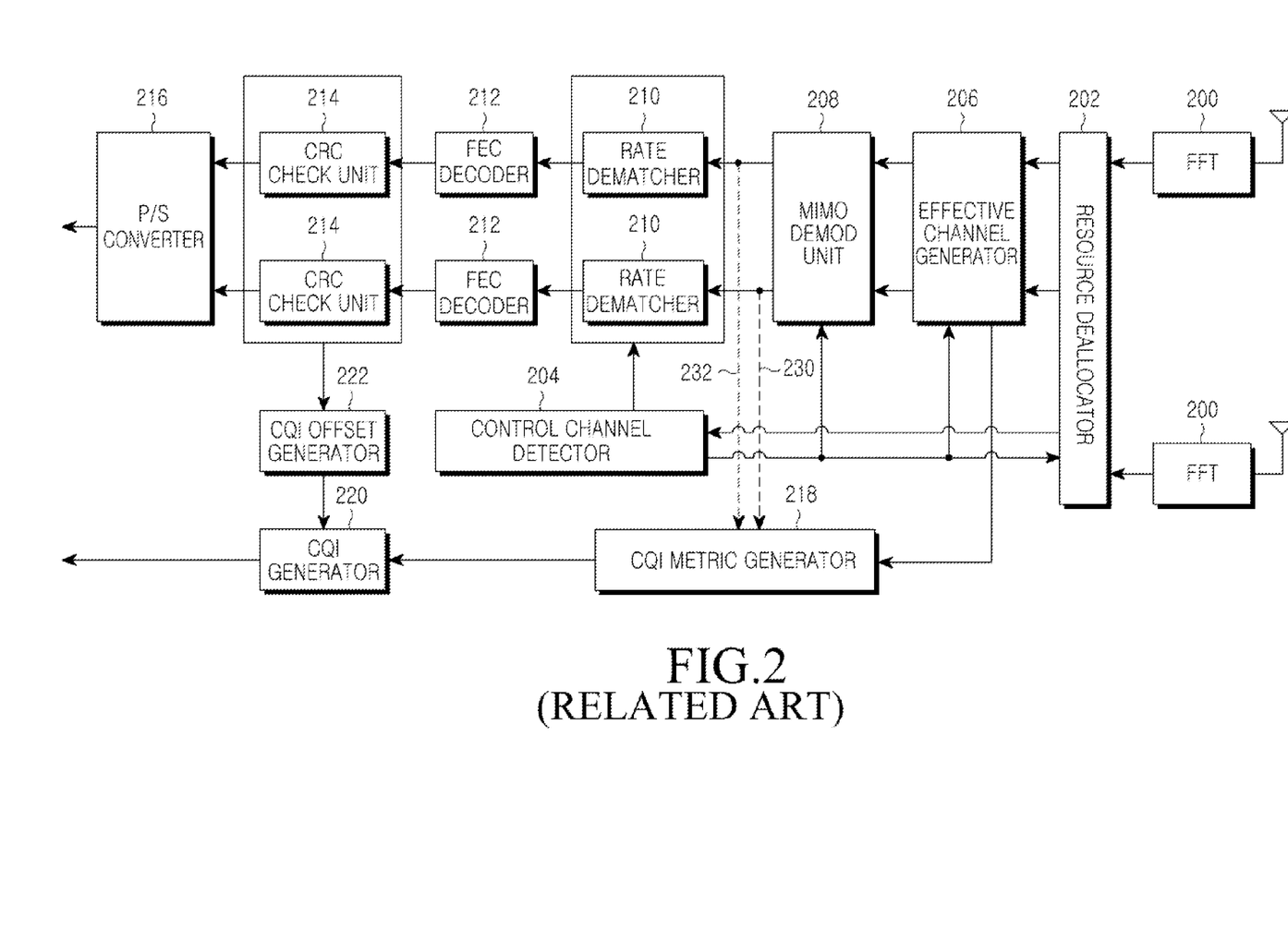
FIG. 2 is a block diagram showing a structure of a receiver corresponding to a transmitter shown in FIG. 1 according to the related art.

FIG. 2 is a block diagram showing a structure of a receiver corresponding to a transmitter shown in FIG. 1 according to the related art.

A signal received by each receiving antenna is transformed from a signal in the time domain to a signal in the frequency domain by a Fast Fourier Transform (FFT) unit 200, and the transformed received signal is divided into a control channel signal and a traffic channel signal at a resource deallocator 202.

A control channel detector 204 detects MCS information (transmitted from a transmitting end) necessary for traffic channel reception, traffic channel resource allocation information, the number of transport layers, precoding matrix index information, and so forth from the control channel signal, using the control channel signal received from the resource deallocator 202 and a predetermined channel estimation value.

An effective channel generator 206 calculates an effective channel value, reflecting an influence of precoding, using the detected number of transport layers and the detected precoding matrix index. If a Reference Signal (RS) used for channel estimation is commonly used for terminals, the effective channel generator 206 would be required because the influence of precoding is not reflected in the channel estimation value. However, if a dedicated RS for channel estimation is allowed (that is, an RS allocated to each user is transmitted after being precoded), the effective channel generator 206 is not required because the influence of precoding has already been reflected in the channel estimation value.

A MIMO demodulation (DEMOD) unit 208 generates a Log Likelihood Ratio (LLR) value using the detected number of transport layers, the effective channel value, and the traffic channel signal transmitted from the resource deallocator 202. The generated LLR value is rate-dematched at a rate dematching unit 210 and then delivered to an FEC decoder 212 for decoding, thus outputting decoded information bits. The decoded information bits then undergo error detection and retransmission request identification at a CRC check unit 214. If there is no error in the decoded information bits, they are transmitted to an upper layer after being parallel-to-serial converted at a Parallel-to-Serial (P/S) converter 216.

A CQI metric generator 218 estimates a CQI metric value using the effective channel value generated in the effective channel generator 206, and transmits the estimated CQI metric value to a CQI generator 220. The CQI metric value refers to a value representing the performance of a traffic channel and a real-time channel status, such as an effective Signal-to-Interference Noise Ratio (SINR) or capacity. In an alternative exemplary embodiment of the present invention, the CQI metric generator 218 may generate the CQI metric value using output LLR values 230 and 232 of the MIMO DEMOD unit 208, instead of the effective channel value output from the effective channel generator 206.

The CQI generator 220 generates a final CQI index to be reported by quantizing the CQI metric value transmitted from the CQI metric generator 218.

A CQI offset generator 222 determines a CQI offset using Acknowledgement (ACK)/Negative Acknowledgement (NACK) information indicating an error detection result output from the CRC check unit 214, and transmits the determined CQI offset to the CQI generator 220. The CQI offset is used for the CQI generator 220 to generate the final CQI index.

When a CQI metric value transmitted from a CQI metric generator 218 is $\mu$, a CQI offset value transmitted from a CQI offset generator 222 is $\delta$, and spectrum efficiency or frequency error rate is not considered, then a CQI index $\sigma_{idx}$ generated by the CQI generator 220 may be expressed by:

$$\sigma_{idx} = \max\{\sigma | \mu - \delta > f_{th}(\sigma)\} \tag{1}$$

or $$\sigma_{idx} = (\max\{\sigma | \mu > f_{th}(\sigma)\}) - \delta \tag{2}$$

where $f_{th}(\sigma)$ indicates a threshold value for a CQI index of $\sigma$. According to antenna correlation or a Multiple Input Multiple Output (MIMO) scheme used for transmission, several threshold tables may exist for $f_{th}(\sigma)$. An example of the MIMO scheme may be a transmission mode according to the Long Term Evolution (LTE) standard. Since a minimum operating time is required to adjust the Modulation and Coding Scheme (MCS) using a reported CQI index, the CQI metric generator 218 includes a prediction filter considering the operating time.

The foregoing conventional scheme generates the CQI offset and adaptively operates according to the CQI offset, but may have a limitation in optimizing spectral efficiency due to a difficulty in prediction of a Frame Error Rate (FER) of the CQI index to be reported, a channel environment estimation error, a limited threshold table, and so forth.

SUMMARY OF THE INVENTION

An aspect of the present invention is to address at least the above-mentioned problems and/or disadvantages and to provide at least the advantages described below. Accordingly, an aspect of the present invention is to provide a method and apparatus for generating a Channel Quality Indicator (CQI) adaptively according to a channel environment.

Another aspect of the present invention is to provide a method and apparatus for generating a CQI, which maximizes spectral efficiency through error rate prediction for a CQI index, using control information such as a channel environment.

Another aspect of the present invention is to provide a method and apparatus for generating a CQI, which can be applied in a system having various channel environments, by adaptively estimating information regarding channel change.

In accordance with an aspect of the present invention, a method for generating a CQI in a wireless communication system is provided. The method includes receiving a Modulation and Coding Scheme (MCS) index and resource allocation information of a traffic channel and calculating a spectral efficiency at a particular time point, determining a temporary CQI index having a spectral efficiency closest to the calculated spectral efficiency in an index set, reading a CQI metric a time $\tau$ before the particular time point, determining, if the temporary CQI index is reported at the particular time point, an error rate based on the CQI metric, the error rate being a probability of an error occurring in a traffic channel after the time $\tau$, receiving an error check result of the traffic channel transmitted at the particular time point and calculating a new error rate by applying a weight to the error check result and the error rate, and determining a CQI index to be fed back to a transmitter using the new error rate.

In accordance with another aspect of the present invention, a method for generating a CQI in a wireless communication system is provided. The method includes receiving a MCS index and resource allocation information of a traffic channel and calculating a spectral efficiency at a particular time point, determining a temporary CQI index having a spectral efficiency closest to the calculated spectral efficiency in an index set, reading a CQI metric a time $\tau$ before the particular time point, determining, if the temporary CQI index is reported at the particular time point, an error rate based on the CQI metric, the error rate being a probability of an error occurring in a traffic channel after the time $\tau$, and determining a CQI index that maximizes an expected spectral efficiency calculated using the new error rate.

In accordance with yet another aspect of the present invention, a method for generating a CQI in a wireless communication system is provided. The method includes receiving a MCS index and resource allocation information of a traffic channel and calculating a spectral efficiency at a particular time point, determining a temporary CQI index having a spectral efficiency closest to the calculated spectral efficiency in an index set, reading a CQI metric a time $\tau$ before the particular time point, determining, if the temporary CQI index is reported at the particular time point, an error rate based on the CQI metric, the error rate being a probability of an error occurring in a traffic channel after the time $\tau$, and determining a CQI index that causes the new error rate to be less than or equal to a threshold.

In accordance with still another aspect of the present invention, a receiver for generating a CQI in a wireless communication system is provided. The receiver includes a control channel detector for outputting a MCS index and resource allocation information of a traffic channel, a Cyclic Redundancy Check (CRC) check unit for outputting an error check result of a traffic channel transmitted at a particular time point, a conditional Frame Error Rate (FER) estimator for receiving the MCS index and resource allocation information of the traffic channel and calculating a spectral efficiency at the particular time point, for determining a temporary CQI index having a spectral efficiency closest to the calculated spectral efficiency in an index set, for reading a CQI metric a time $\tau$ before the particular time point, for determining, if the temporary CQI index is reported at the particular time point, an error rate based on the CQI metric, the error rate being a probability of an error occurring in a traffic channel after the time $\tau$, and for receiving an error check result of the traffic channel transmitted at the particular time point and calculating a new error rate by applying a weight to the error check result and the error rate, and a CQI generator for determining a CQI index to be fed back to a transmitter using the new error rate.

In accordance with yet another aspect of the present invention, a receiver for generating a CQI in a wireless communication system is provided. The receiver includes a control channel detector for outputting a MCS index and resource allocation information of a traffic channel, a CRC check unit for outputting an error check result of a traffic channel transmitted at a particular time point, a conditional FER estimator for receiving the MCS index and resource allocation information of the traffic channel and calculating a spectral efficiency at the particular time point, for determining a temporary CQI index having a spectral efficiency closest to the calculated spectral efficiency in an index set, for reading a CQI metric a time τ before the particular time point, and, if the temporary CQI index is reported at the particular time point, for determining an error rate based on the CQI metric, the error rate being a probability of an error occurring in a traffic channel after the time τ, and a CQI generator for determining a CQI index which maximizes an expected spectral efficiency calculated using the new error rate.

In accordance with a further aspect of the present invention, a receiver for generating a CQI in a wireless communication system is provided. The receiver includes a control channel detector for outputting a MCS index and resource allocation information of a traffic channel, a CRC check unit for outputting an error check result of a traffic channel transmitted at a particular time point, a conditional FER estimator for receiving the MCS index and resource allocation information of the traffic channel and calculating a spectral efficiency at the particular time point, for determining a temporary CQI index having a spectral efficiency closest to the calculated spectral efficiency in an index set, for reading a CQI metric a time τ before the particular time point, and, if the temporary CQI index is reported at the particular time point, for determining an error rate based on the CQI metric, the error rate being a probability of an error occurring in a traffic channel after the time τ, and a CQI generator for determining a CQI index that causes the new error rate to be less than or equal to a threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 3:
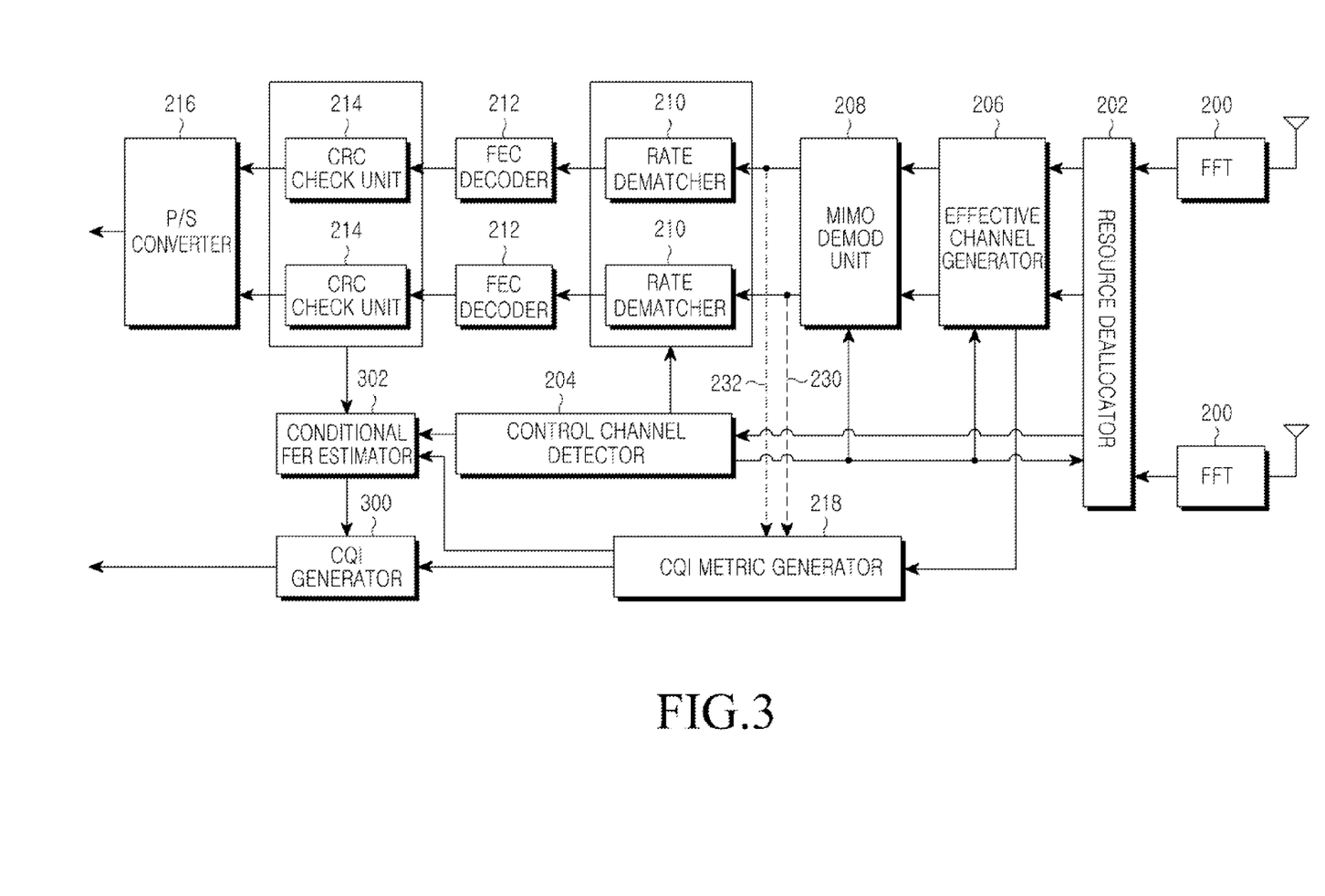
FIG. 3 is a block diagram showing a receiver to which a Channel Quality Indicator (CQI) generator according to an exemplary embodiment of the present invention is applied.

FIG. 3 is a block diagram showing a structure of a receiver to which a method for generating a Channel Quality Indicator (CQI) according to an exemplary embodiment of the present invention is applied.

Referring to FIG. 3, a description of components except for a CQI generator 300 and a conditional Frame Error Rate (FER) estimator 302 is substantially the same as in FIG. 2, and thus will not be provided for sake of conciseness.

First, a description will be made of operations of the CQI generator 300.

For a channel value Λ indicating a channel environment and a resource allocation indicator Φ indicating an allocation resource, let probability that an error will occur during a $k^{th}$ transmission of a transport block using an MCS index m be $Pr_e(k|m,\Lambda,\Phi)$. Then, an expected spectral efficiency $E_m(S|\Lambda,\Phi)$ of a transport block using the MCS index m in the given channel environment Λ can be expressed as:

$$E_m(S \mid \Lambda, \Phi) = \sum_{k=1}^{L} f_{se}(m, k, \Phi)(1 - Pr_e(k \mid m, \Lambda, \Phi)) \prod_{j=1}^{k-1} Pr_e(j \mid m, \Lambda, \Phi) \qquad (3)$$

where $f_{se}(m,k,\Phi)$ indicates a spectral efficiency in the $k^{th}$ retransmission of the transport block using the MCS index m.

For k=1, the following equation can be completed:

$$\prod_{j=1}^{k-1} Pr_e(j \mid m, \Lambda, \Phi) = 1 \qquad (4)$$

where L indicates a maximum number of retransmissions.

If $Pr_e(k|m,\Lambda,\Phi)$ and $f_{se}(m,k,\Phi)$ are known for m and k in a given channel environment $\Lambda$ and resource allocation indicator $\Phi$, the use of an MCS index for which $E_m(S|\Lambda)$ of Equation (3) is maximized would achieve optimal performance in Adaptive Modulation and Coding (AMC) combined with Hybrid Automatic Repeat Request (HARQ).

Since $Pr_e(k|m,\Lambda,\Phi)$, where k is greater than 2, is much smaller than $Pr_e(1|m,\Lambda,\Phi)$ and is close to 0, Equation (3) can be approximated to:

$$E_m(S|\Lambda,\Phi) \approx f_{se}(m,1,\Phi)(1-Pr_e(1|m,\Lambda,\Phi))+f_{se}(m,2,\Phi) Pr_e(1|m,\Lambda,\Phi) \quad (5)$$

where $f_{se}(m,2,\Phi)$ is subject to change according to a modulation order and the degree of resource allocation used for retransmission in HARQ. On the assumption that the modulation order and the resource allocation used in initial transmission are uniform, Equation (5) can be approximated to:

$$E_m(S|\Lambda,\Phi) \approx f_{se}(m,1,\Phi)\left(1-\frac{1}{2}Pr_e(1|m,\Lambda,\Phi)\right) \quad (6)$$

Since a final error rate of a transport block after L retransmissions must be lower than a predetermined level, L being the maximum number of retransmissions, an initial transmission error rate may be lowered by approximating Equation (5) as below.

$$E_m(S|\Lambda,\Phi) \approx f_{se}(m,1,\Phi)(1-Pr_e(1|m,\Lambda,\Phi)) \quad (7)$$

By using Equation (6) and Equation (7), the expected spectral efficiencies for selection of the resource allocation indicator $\Phi\tau$ at a time point (t+$\tau$) when a CQI index $\sigma$ is reported in a given channel environment $\Lambda_t$ at a time point t can be expressed as follows:

$$E_{\sigma,\tau}(S|\Lambda_t,\Phi_\tau) \approx \sum_{m \in C_\sigma} f_{se}(m,1,\Phi_\tau)\left(1-\frac{1}{2}Pr_{e,\tau}(1|m,\Lambda_\tau,\Phi_\tau)\right)P_{\sigma,\tau}(m,\Phi_\tau) \quad (8)$$

$$E_{\sigma,\tau}(S|\Lambda_t,\Phi_\tau) \approx \sum_{m \in C_\sigma} f_{se}(m,1,\Phi_\tau)(1-Pr_{e,\tau}(1|m,\Lambda_\tau,\Phi_\tau))P_{\sigma,\tau}(m,\Phi_\tau) \quad (9)$$

where $C_\sigma$ indicates a group of MCS index values that can be determined when a CQI index $\sigma$ is reported at the time point t, and $P_{\sigma,\tau}(m,\Phi_\tau)$ at the time point t indicates a probability that the MCS index m and the resource allocation indicator $\Phi_\tau$ will be selected after the time $\tau$ from the report of the CQI index $\sigma$. If $f_{se}(m,1,\Phi_\tau)$ is replaced with an average spectral efficiency with respect to the CQI index $\sigma$ for the resource allocation indicator $\Phi_\tau$ and the MCS index m after the time $\tau$ in determination of the CQI index $\sigma$ at the time point t at the receiving end, Equation (8) and Equation (9) can be, respectively, approximated to:

$$E_{\sigma,\tau}(S|\Lambda_t) \approx f_{se}(\sigma) \sum_{m \in C_\sigma} P_{\sigma,\tau}(m,\Phi_\tau)\left(1-\frac{1}{2}Pr_{e,\tau}(1|m,\Lambda_\tau,\Phi_\tau)\right) = f_{se}(\sigma)\left(1-\frac{1}{2}Pr_{e,\tau}(1|\sigma,\Lambda_t)\right) \quad (10)$$

-continued $$E_{\sigma,\tau}(S|\Lambda_t) \approx f_{se}(\sigma) \sum_{m \in C_\sigma} P_{\sigma,\tau}(m,\Phi_\tau)(1-Pr_{e,\tau}(1|m,\Lambda_\tau,\Phi_\tau)) = f_{se}(\sigma)(1-Pr_{e,\tau}(1|\sigma,\Lambda_t)) \quad (11)$$

where $f_{se}(\sigma)$ indicates an average spectral efficiency in initial transmission for the CQI index $\sigma$, and $Pr_{e,\tau}(1|\sigma,\Lambda_t)$ indicates a probability that a Negative Acknowledgement (NACK) will be generated in a Physical Downlink Shared CHannel (PDSCH) transmitted after the time $\tau$ when the CQI index $\sigma$ is reported at the time point t.

Therefore, if $Pr_{e,\tau}(1|\sigma,\Lambda_t)$ can be known at the receiving end, spectral efficiency can be maximized after the time $\tau$ by reporting a CQI index $\sigma_{report}$ which maximizes $E_{\sigma,\tau}(S|\Lambda_t)$ of Equation (10) and Equation (11).

Figure 4:
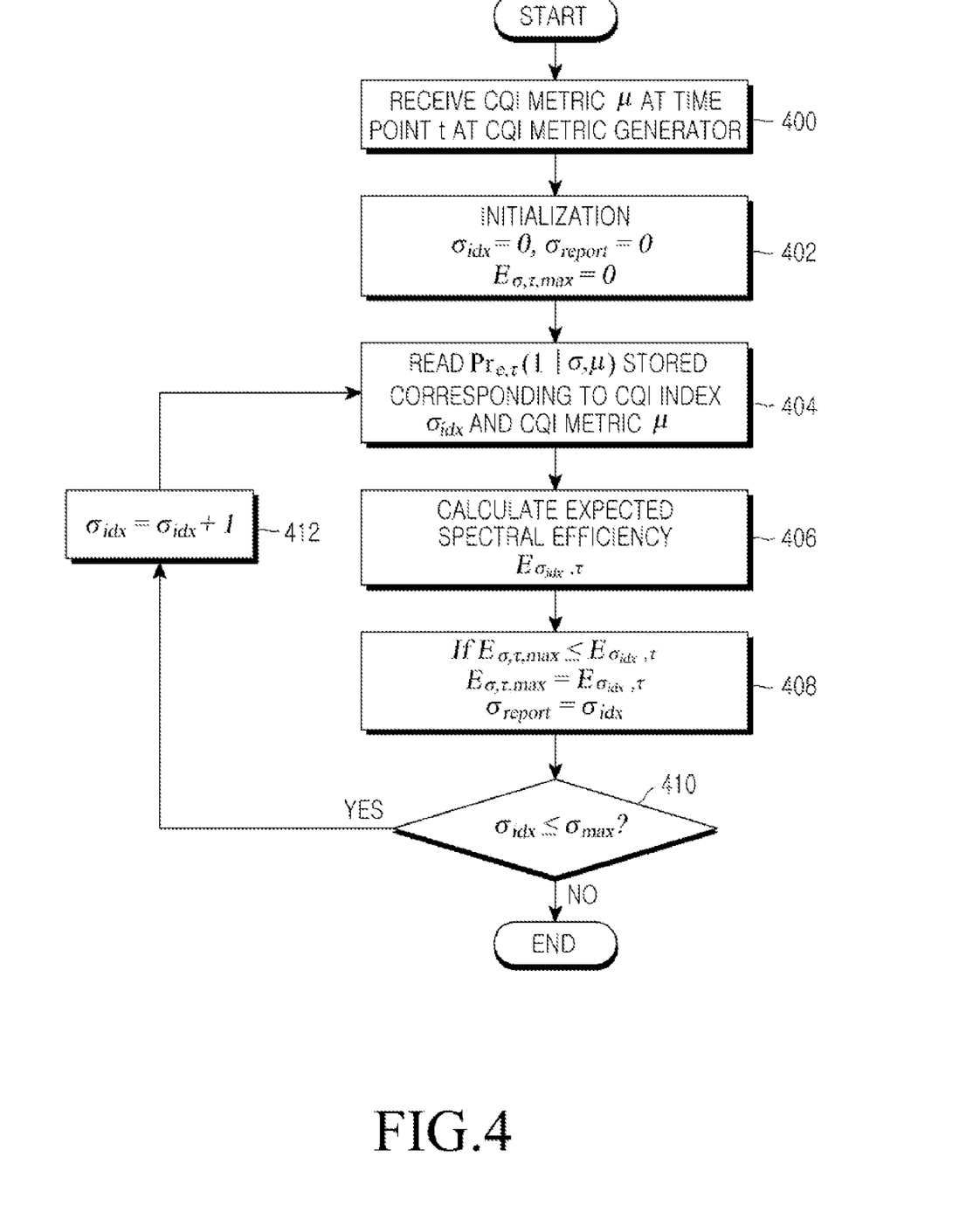
FIG. 4 is an operation flowchart of a CQI generator when spectral efficiency is maximized according to an exemplary embodiment of the present invention.
Figure 5:
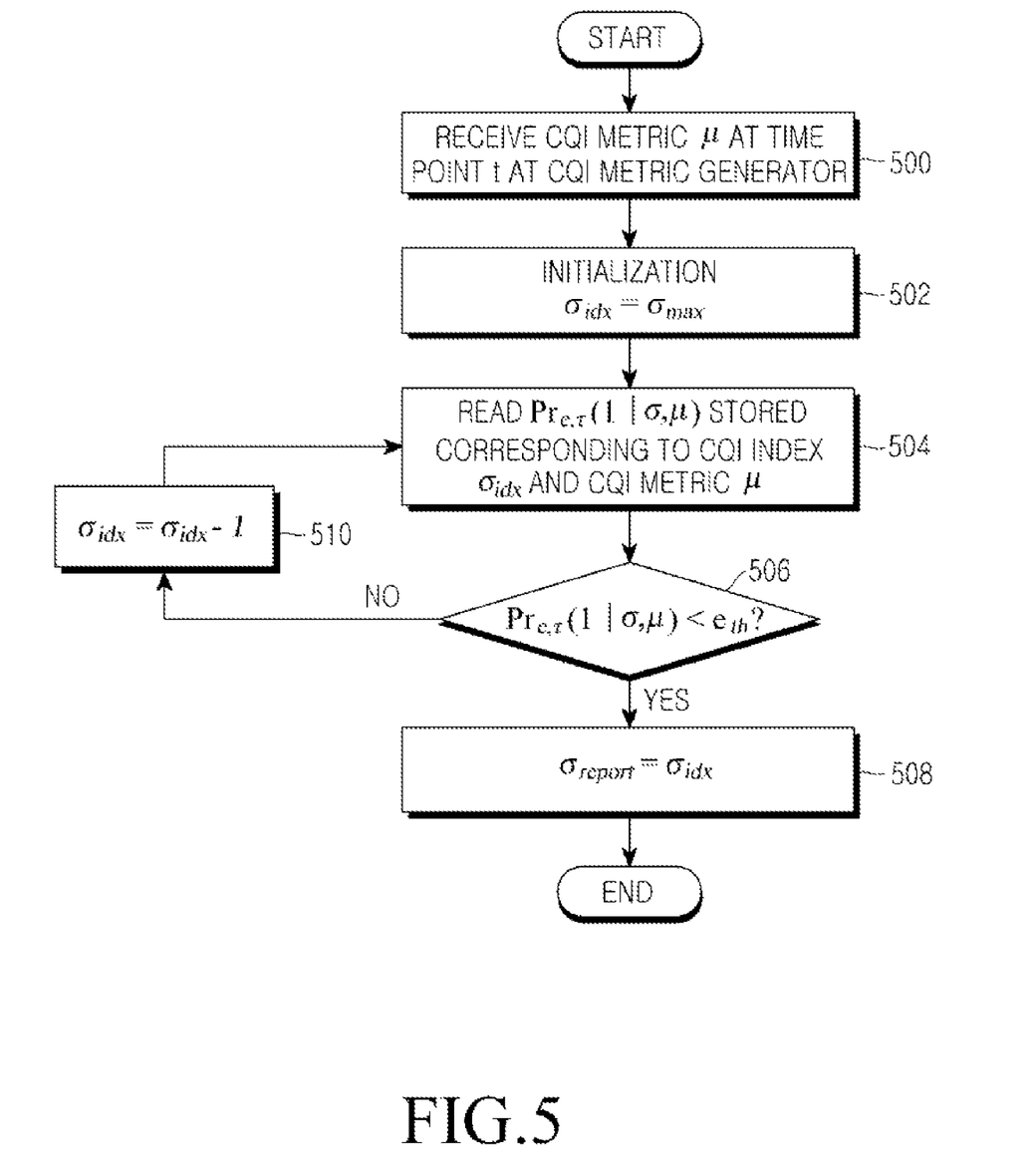
FIG. 5 is an operation flowchart of a CQI generator when error rate restriction is applied according to an exemplary embodiment of the present invention.

The CQI generator 300 acquires the CQI index $\sigma_{report}$ which maximizes $E_{\sigma,\tau}(S,\Lambda_t)$ and reports the CQI index $\sigma_{report}$. An exemplary operation flow of the CQI generator 300 is shown in FIGS. 4 and 5.

By substituting Equation (10) and Equation (11) into Equation (12), the CQI generator 300 can generate the CQI index $\sigma_{report}$ which maximizes spectral efficiency for a case where HARQ is applied and for initial transmission.

The following Equation (12) is an equation for generating a CQI index for maximizing spectral efficiency.

$$\sigma_{report}=\arg_\sigma \max\{E_{\sigma,\tau}(S|\Lambda_t)\} \quad (12)$$

FIG. 4 is a flowchart showing an operation flow of a CQI generator for maximizing spectral efficiency according to an exemplary embodiment of the present invention.

Referring to FIG. 4, in step 400, the CQI generator 300 receives a CQI metric $\mu$ at the time point t from the CQI metric generator 218.

In step 402, the CQI generator 300 initializes $\sigma_{idx}$, $\sigma_{report}$, and $E_{\sigma,\tau,max}$ to 0.

In step 404, the CQI generator 300 reads $Pr_{e,\tau}(1|\sigma,\mu)$ corresponding to the received CQI metric $\mu$ and CQI index $\sigma_{idx}$ from a memory which stores matching information among the CQI metric $\mu$, the CQI index $\sigma_{idx}$, and $Pr_{e,\tau}(1|\sigma,\mu)$.

In step 406, the CQI generator 300 calculates an expected spectral efficiency $E\sigma_{idx,\tau}$ based on the read $Pr_{e,\tau}(1|\sigma,\mu)$ using Equation (10) or Equation (11). Herein, the CQI metric represents a channel environment $\Lambda_t$, and thus $Pr_{e,\tau}(1|\sigma_t)$ is substituted by $Pr_{e,\tau}(1|\sigma,\mu_t)$.

In step 408, the CQI generator 300 compares $E_{\sigma,\tau,max}$ with $E\sigma_{idx,\tau}$, such that if $E_{\sigma,\tau,max}$ is less than or equal to $E\sigma_{idx,\tau}$, the CQI generator 300 sets $E\sigma_{idx,\tau}$ to $E_{\sigma,\tau,max}$ and $\sigma_{report}$ to $\sigma_{idx}$. In this way, $E_{\sigma,\tau,max}$ is set to the maximum value among calculated spectral efficiencies at all times.

In step 410, the CQI generator 300 determines if $\sigma_{idx}$ is less than or equal to $\sigma_{max}$. If the CQI generator determines that $\sigma_{idx}$ is less than or equal to $\sigma_{max}$, the CQI generator 300 calculates ($\sigma_{idx}=\sigma_{idx}+1$) in step 412 and then goes to step 404 to repeat the calculation in step 406 and the comparison in step 408. On the other hand, if the CQI generator 300 determines that $\sigma_{idx}$ is not less than or equal to $\sigma_{max}$, the CQI generator 300 finally outputs $\sigma_{report}$ according to Equation (12) and ends the procedure. $\sigma_{max}$ is the maximum value among indices belonging to an index set for use in the CQI report.

The CQI generator 300 may generate a CQI index that maximizes spectral efficiency, but it may also generate a CQI index considering a particular value $e_{th}$ specified for limiting an error rate of a traffic channel in a communication standard according to an exemplary embodiment of the present invention. A CQI index for limiting the error rate of the traffic channel below a particular value can be generated as follows:

$$\sigma_{report} = \max\{\sigma | Pr_{\sigma,\tau}(1|\sigma,\Lambda_t) \leq e_{th}\} \qquad (13)$$

FIG. 5 is a flowchart showing an operation flow of a CQI generator that uses error rate limitation according to an exemplary embodiment of the present invention.

Referring to FIG. 5, in step 500, the CQI generator 300 receives the CQI metric μ at the time point t from the CQI metric generator 218.

In step 502, the CQI generator 300 initializes $\sigma_{idx}$ to $\sigma_{max}$ which is the maximum value among indices belonging to an index set.

In step 504, the CQI generator 300 reads stored $Pr_{e,\tau}(1|\sigma,\mu)$ with respect to the received CQI metric μ and CQI index $\sigma_{idx}$.

In step 506, the CQI generator 300 determines if the error rate $Pr_{e,\tau}(1|\sigma,\mu)$ is less than a threshold $e_{th}$. If it is determined in step 506 that the error rate $Pr_{e,\tau}(1|\sigma,\mu)$ is not less than the threshold $e_{th}$, the CQI generator 300 calculates ($\sigma_{idx}=\sigma_{idx}-1$) in step 510 and then goes to step 504 to repeat the read-out operation in step 504 and the comparison in step 506. On the other hand, if it is determined in step 506 that the error rate $Pr_{e,\tau}(1|\sigma,\mu)$ is less than the threshold $e_{th}$, the CQI generator 300 goes to step 508.

In step 508, the CQI generator 300 sets $\sigma_{report}$ to $\sigma_{idx}$, and outputs $\sigma_{idx}$.

Therefore, in order for the CQI generator 300 to determine the CQI index, $Pr_{e,\tau}(1|\sigma,\Lambda_t)$ must be estimated at the receiving end. $Pr_{e,\tau}(1|\sigma,\Lambda_t)$ can be estimated using MCS index and resource allocation information of a traffic channel (e.g., a PDSCH channel of the LTE) transmitted to the receiving end, ACK/NACK information at the transmission, and a CQI metric of the time τ before the transmission.

The estimation of $Pr_{e,\tau}(1|\sigma,\Lambda_t)$ is performed by the conditional FER estimator 302 shown in FIG. 3.

Figure 6:
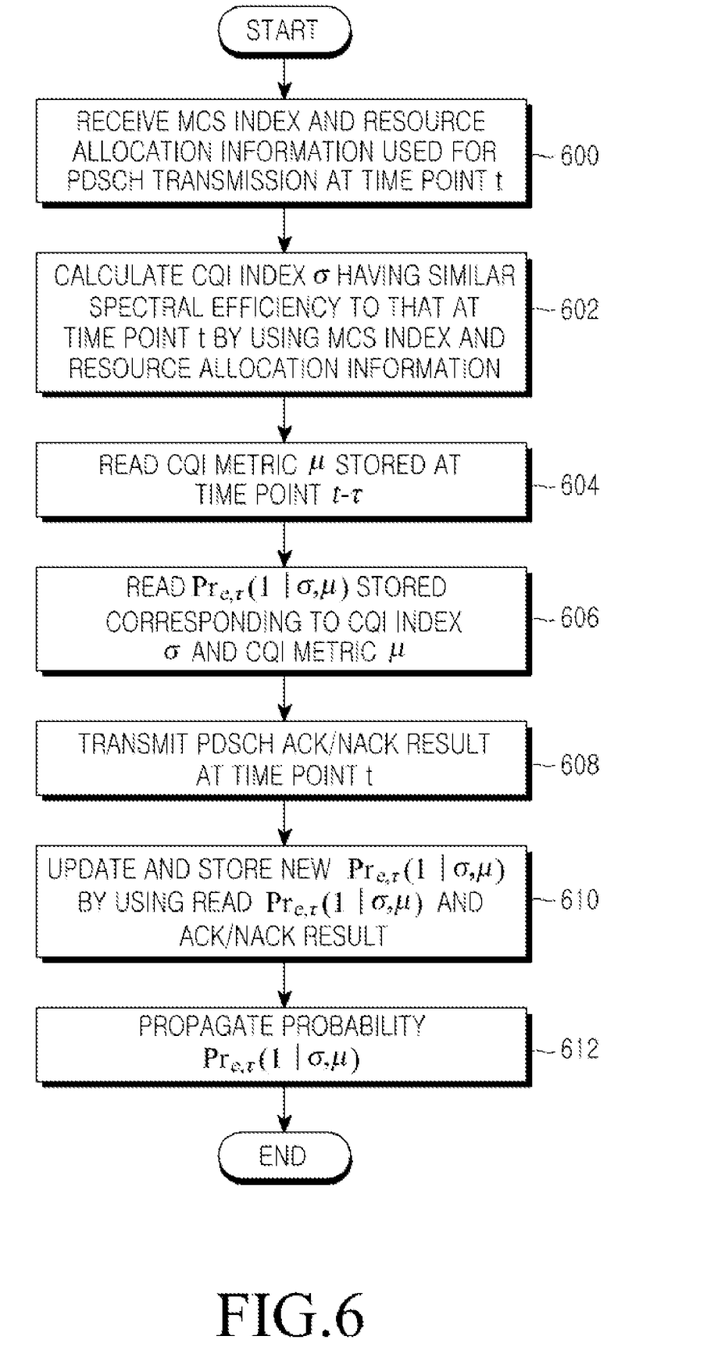
FIG. 6 is an operation flowchart of a conditional Frame Error Rate (FER) estimator according to an exemplary embodiment of the present invention.

FIG. 6 is a flowchart showing an operation flow of a conditional FER estimator.

Referring to FIG. 6, in step 600, the conditional FER estimator 302 receives information, such as an MCS index and resource allocation information that is used for transmission at the time point t at which PDSCH transmission is performed, from the control channel detector 204.

In step 602, the conditional FER estimator 302 calculates a spectral efficiency using the received MCS index and resource allocation information, thereby acquiring the CQI index σ having an average spectral efficiency that is closest to the calculated spectral efficiency in an index set.

In step 604, the conditional FER estimator 302 reads the CQI metric μ which is measured at time (t−τ) and then stored. Since the conditional FER estimator 302 must read the CQI metric at the time (t−τ), it must store the CQI metric, transmitted from the CQI metric generator 218, at intervals (e.g., at intervals of τ) that are different from CQI report intervals for every transmission unit (for e.g., every subframe in the LTE).

In step 606, the conditional FER estimator 302 reads $Pr_{e,\tau}(1|\sigma,\mu)$ stored corresponding to the CQI index σ calculated in step 602 and the CQI metric μ read in step 604 from the memory which stores matching information between the CQI index σ and the CQI metric μ.

In step 608, the conditional FER estimator 302 receives an ACK/NACK result of the PDSCH transmitted at the time point t from the CRC check unit 214.

In step 610, the conditional FER estimator 302 updates $Pr_{e,\tau}(1|\sigma,\mu)$ using the $Pr_{e,\tau}(1|\sigma,\mu)$ read in step 606 and the ACK/NACK result received in step 608, based on Equation (14).

$$P_{e,\tau,new}(1|\sigma,\mu) = P_{e,\tau,old}(1|\sigma,\mu) \times (1-g) + I(NACK) \times g \qquad (14)$$

In Equation (14), I(NACK) is 1 if the PDSCH transmitted at the time point t is a NACK, is 0 for the ACK PDSCH and g is an arbitrary weight ranging from 0 to 1. For g of 1, an influence of the NACK of the PDSCH transmitted at the time point t upon adaptive CQI information generation is maximum; for g of 0, an influence of the NACK of the PDSCH transmitted at the time point t is not considered.

Although an Infinite Impulse Response (IIR) filter has been used to estimate $Pr_{e,\tau}(1|\sigma,\mu)$ as shown in Equation (12), the present invention is not limited to an estimation method of $Pr_{e,\tau}(1|\sigma,\mu)$.

In step 612, the conditional FER estimator 302 updates neighbor (preceding or following) probabilities using the updated $Pr_{e,\tau,new}(1|\sigma,\mu)$ in Equation (14). This step is necessary for rapid update, and thus may be skipped. The changing feature of $Pr_{e,\tau}(1|\sigma,\mu)$ used in step 612 is as follows for $a \geq 0$ and $b \geq 0$.

$$Pr_{e,\tau,old}(1|\sigma-a,\mu+b) \leq Pr_{e,\tau,new}(1|\sigma,\mu) \qquad (15)$$

$$Pr_{e,\tau,old}(1|\sigma+a,\mu-b) \geq Pr_{e,\tau,new}(1|\sigma,\mu) \qquad (16)$$

That is, the conditional FER estimator 302 modifies a previously stored value to the updated $Pr_{e,\tau,new}(1|,\mu)$ and stores the updated $Pr_{e,\tau,new}(1|,\mu)$ if the updated $Pr_{e,\tau,new}(1|,\mu)$ and the previously stored value do not meet the conditions of Equation (15) or Equation (16). In this case, the conditional FER estimator 302 may compare conditions of Equation (15) with those of Equation (16) for all combinations of σ and μ, or apply the comparison for some of the combinations.

By adaptively estimating the ACK/NACK probability of the PDSCH after a delay of τ for each combination of a CQI index and a CQI metric at the receiving end, the CQI index which maximizes spectral efficiency is determined, thus improving system spectral efficiency in an HARQ-AMC combined system. Moreover, by estimating the ACK/NACK probability adaptively according to a change in channel, useful performance is expected in various channel environments.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a Channel Quality Indicator (CQI) in a wireless communication system, the method comprising:
   receiving a Modulation and Coding Scheme (MCS) index and resource allocation information of a traffic channel and calculating a spectral efficiency at a particular time point;
   determining a temporary CQI index having a spectral efficiency closest to the calculated spectral efficiency in an index set;
   reading a CQI metric a time τ before the particular time point;
   if the temporary CQI index is reported at the particular time point, determining an error rate based on the CQI metric, the error rate being a probability of an error occurring in a traffic channel after the time τ;
   receiving an error check result of the traffic channel transmitted at the particular time point and calculating a new error rate by applying a weight to the error check result and the error rate; and
   determining a CQI index to be fed back to a transmitter using the new error rate.

2. The method of claim 1, wherein the determining of the temporary CQI index comprises determining a CQI index that maximizes an expected spectral efficiency calculated using the new error rate.

3. The method of claim 1, wherein the determining of the temporary CQI index comprises determining a CQI index that causes the new error rate to be less than or equal to a threshold.

4. The method of claim 1, further comprising updating preceding and following error rates with respect to the error rate corresponding to the temporary CQI index and the CQI metric from among previously stored probabilities using the new error rate.

5. The method of claim 1, wherein the calculation of the new error rate comprises using the equation:

$$P_{e,\tau,new}(1|\sigma,\mu)=P_{e,\tau,old}(1|\sigma,\mu)\times(1-g)+I(NACK)\times g,$$

where $\sigma$ indicates the temporary CQI index, $\mu$ indicates the CQI metric, I(NACK) is a function which returns 1 if an error occurs in the traffic channel transmitted at the particular time point and returns 0 if there is no error, $Pr_{e,\tau,old}$ indicates the error rate, $Pr_{e,\tau,new}$ indicates the new error rate, and g is the weight ranging between 0 and 1.

6. The method of claim 1, wherein the determining of the temporary CQI index comprises using the equation:

$$\sigma_{report}=\arg_\sigma \max\{E_{\sigma,\tau}(S|\Lambda_t)\},$$

where $E_{\sigma,\tau}(S|A)$ indicates an expected spectral efficiency calculated based on the CQI index, $\sigma_{report}$ indicates the determined temporary CQI index, and $\sigma$ indicates an arbitrary CQI index belonging to an index set.

7. The method of claim 6, wherein $E_{\sigma,\tau}(S|A)$ is determined using at least one of the equations:

$$E_{\sigma,\tau}(S|\Lambda_t) \approx f_{se}(\sigma)\left(1-\frac{1}{2}Pr_{e,\tau}(1|\sigma,\Lambda_t)\right) \text{ and}$$

$$E_{\sigma,\tau}(S|\Lambda_t) \approx f_{se}(\sigma)(1-Pr_{e,\tau}(1|\sigma,\Lambda_t)),$$

where $f_{se}(\sigma)$ indicates an average spectral efficiency in initial transmission for the temporary CQI index $\sigma$, and $Pr_{e,\tau}(1|\sigma,\Lambda_t)$ indicates a probability that a Negative Acknowledgement (NACK) will be generated in a control channel transmitted after the time $\tau$ when the temporary CQI index $\sigma$ is reported at the particular time point.

8. The method of claim 1, wherein the determining of the temporary CQI index comprises using the equation:

$$\sigma_{report}=\max\{\sigma|Pr_{\sigma,\tau}(1|\sigma,\Lambda_t)\leq e_{th}\},$$

where $e_{th}$ indicates the threshold, $Pr_{e,\tau}(1|\sigma,\Lambda_t)$ indicates the error rate, $\sigma_{report}$ indicates the determined temporary CQI index, and $\sigma$ indicates an arbitrary CQI index belonging to an index set.

9. A method for generating a Channel Quality Indicator (CQI) in a wireless communication system, the method comprising:
    receiving a Modulation and Coding Scheme (MCS) index and resource allocation information of a traffic channel and calculating a spectral efficiency at a particular time point;
    determining a temporary CQI index having a spectral efficiency closest to the calculated spectral efficiency in an index set;
    reading a CQI metric a time $\tau$ before the particular time point;
    if the temporary CQI index is reported at the particular time point, determining an error rate based on the CQI metric, the error rate being a probability of an error occurring in a traffic channel after the time $\tau$; and
    determining a CQI index that maximizes an expected spectral efficiency calculated using the new error rate.

10. The method of claim 9, wherein the determining of the temporary CQI index comprises using the equation:

$$\sigma_{report}=\arg_\sigma \max\{E_{\sigma,\tau}(S|\Lambda_t)\},$$

where $E_{\sigma,\tau}(S|A)$ indicates an expected spectral efficiency calculated based on the CQI index, $\sigma_{report}$ indicates the determined temporary CQI index, and $\sigma$ indicates an arbitrary CQI index belonging to an index set.

11. A method for generating a Channel Quality Indicator (CQI) in a wireless communication system, the method comprising:
    receiving a Modulation and Coding Scheme (MCS) index and resource allocation information of a traffic channel and calculating a spectral efficiency at a particular time point;
    determining a temporary CQI index having a spectral efficiency closest to the calculated spectral efficiency in an index set;
    reading a CQI metric a time $\tau$ before the particular time point;
    if the temporary CQI index is reported at the particular time point, determining an error rate based on the CQI metric, the error rate being a probability of an error occurring in a traffic channel after the time $\tau$; and
    determining a CQI index that causes the new error rate to be less than or equal to a threshold.

12. The method of claim 11, wherein the determining of the temporary CQI index comprises using the equation:

$$\sigma_{report}=\max\{\sigma|Pr_{\sigma,\tau}(1|\sigma,\Lambda_t)\leq e_{th}\},$$

where $e_{th}$ indicates the threshold, $Pr_{e,\tau}(1|\sigma,\Lambda_t)$ indicates the error rate, $\sigma_{report}$ indicates the determined temporary CQI index, and $\sigma$ indicates an arbitrary CQI index belonging to an index set.

13. A receiver for generating a Channel Quality Indicator (CQI) in a wireless communication system, the receiver comprising:
    a control channel detector for outputting a Modulation and Coding Scheme (MCS) index and resource allocation information of a traffic channel;
    a Cyclic Redundancy Check (CRC) check unit for outputting an error check result of a traffic channel transmitted at a particular time point t;
    a conditional Frame Error Rate (FER) estimator for receiving the MCS index and resource allocation information of the traffic channel and calculating a spectral efficiency at the particular time point, for determining a temporary CQI index having a spectral efficiency closest to the calculated spectral efficiency in an index set, for reading a CQI metric a time $\tau$ before the particular time point, for determining, if the temporary CQI index is reported at the particular time point, an error rate based on the CQI metric, the error rate being a probability of an error occurring in a traffic channel after the time $\tau$, and for receiving an error check result of the traffic channel transmitted at the particular time point and calculating a new error rate by applying a weight to the error check result and the error rate; and
    a CQI generator for determining a CQI index to be fed back to a transmitter using the new error rate.

14. The receiver of claim 13, wherein the CQI generator determines the temporary CQI index that maximizes an expected spectral efficiency calculated using the new error rate.

15. The receiver of claim 13, wherein the CQI generator determines the temporary CQI index that causes the new error rate to be less than or equal to a threshold.

16. The receiver of claim 13, wherein the conditional FER estimator updates preceding and following error rates with respect to the error rate corresponding to the temporary CQI index and the CQI metric from among previously stored probabilities using the new error rate.

17. The receiver of claim 13, wherein the conditional FER estimator calculates the new error rate using the equation:

$$P_{e,\tau,new}(1|\sigma,\mu) = P_{e,\tau,old}(1|\sigma,\mu) \times (1-g) + I(NACK) \times g,$$

where $\sigma$ indicates the temporary CQI index, $\mu$ indicates the CQI metric, I(NACK) is a function which returns 1 if an error occurs in the traffic channel transmitted at the particular time point and returns 0 if there is no error, $Pr_{e,\tau,old}$ indicates the error rate, $Pr_{e,\tau,new}$ indicates the new error rate, and g is the weight ranging between 0 and 1.

18. The receiver of claim 13, wherein the CQI generator determines the temporary CQI index using the equation:

$$\sigma_{report} = \arg_\sigma \max\{E_{\sigma,\tau}(S|\Lambda_t)\},$$

where $E_{\sigma,\tau}(S|A)$ indicates an expected spectral efficiency calculated based on the CQI index, $\sigma_{report}$ indicates the determined CQI index, and $\sigma$ indicates an arbitrary CQI index belonging to an index set.

19. The receiver of claim 18, wherein $E_{\sigma,\tau}(S|A)$ is determined using at least one of the equations:

$$E_{\sigma,\tau}(S|\Lambda_t) \approx f_{se}(\sigma)\left(1 - \frac{1}{2}Pr_{e,\tau}(1|\sigma,\Lambda_t)\right) \text{ and}$$

$$E_{\sigma,\tau}(S|\Lambda_t) \approx f_{se}(\sigma)(1 - Pr_{e,\tau}(1|\sigma,\Lambda_t)),$$

where $f_{se}(\sigma)$ indicates an average spectral efficiency in initial transmission for the temporary CQI index $\sigma$, and $Pr_{e,\tau}(1|\sigma,\Lambda_t)$ indicates a probability that a Negative Acknowledgement (NACK) will be generated in a control channel transmitted after the time $\tau$ when the temporary CQI index $\sigma$ is reported at the particular time point.

20. The receiver of claim 13, wherein the CQI generator determines the temporary CQI index using the equation:

$$\sigma_{report} = \max\{\sigma | Pr_{\sigma,\tau}(1|\sigma,\Lambda_t) \leq e_{th}\},$$

where $e_{th}$ indicates the threshold, $Pr_{e,\tau}(1|\sigma,\Lambda_t)$ indicates the error rate, $\sigma_{report}$ indicates the determined CQI index, and $\sigma$ indicates an arbitrary CQI index belonging to an index set.

21. A receiver for generating a Channel Quality Indicator (CQI) in a wireless communication system, the receiver comprising:
- a control channel detector for outputting a Modulation and Coding Scheme (MCS) index and resource allocation information of a traffic channel;
- a Cyclic Redundancy Check (CRC) check unit for outputting an error check result of a traffic channel transmitted at a particular time point;
- a conditional Frame Error Rate (FER) estimator for receiving the MCS index and resource allocation information of the traffic channel and calculating a spectral efficiency at the particular time point, for determining a temporary CQI index having a spectral efficiency closest to the calculated spectral efficiency in an index set, for reading a CQI metric a time $\tau$ before the particular time point, and, if the temporary CQI index is reported at the particular time point, for determining an error rate based on the CQI metric, the error rate being a probability of an error occurring in a traffic channel after the time $\tau$; and
- a CQI generator for determining a CQI index that maximizes an expected spectral efficiency calculated using the new error rate.

22. The receiver of claim 21, wherein the CQI generator determines the CQI index using the equation:

$$\sigma_{report} = \arg_\sigma \max\{E_{\sigma,\tau}(S|\Lambda_t)\},$$

where $E_{\sigma,\tau}(S|A)$ indicates an expected spectral efficiency calculated based on the temporary CQI index, $\sigma_{report}$ indicates the determined CQI index, and $\sigma$ indicates an arbitrary CQI index belonging to a predetermined index set.

23. A receiver for generating a Channel Quality Indicator (CQI) in a wireless communication system, the receiver comprising:
- a control channel detector for outputting a Modulation and Coding Scheme (MCS) index and resource allocation information of a traffic channel;
- a Cyclic Redundancy Check (CRC) check unit for outputting an error check result of a traffic channel transmitted at a particular time point;
- a conditional Frame Error Rate (FER) estimator for receiving the MCS index and resource allocation information of the traffic channel and calculating a spectral efficiency at the particular time point, for calculating a temporary CQI index having a spectral efficiency closest to the calculated spectral efficiency in an index set, for reading a CQI metric a time $\tau$ before the particular time point, and, if the temporary CQI index is reported at the particular time point, for determining an error rate based on the CQI metric, the error rate being a probability of an error occurring in a traffic channel after the time $\tau$; and
- a CQI generator for determining a CQI index which causes the new error rate to be less than or equal to a threshold.

24. The receiver of claim 23, wherein the CQI generator determines the CQI index using the equation:

$$\sigma_{report} = \max\{\sigma | Pr_{\sigma,\tau}(1|\sigma,\Lambda_t) \leq e_{th}\},$$

where $e_{th}$ indicates the threshold, $Pr_{e,\tau}(1|\sigma,\Lambda_t)$ indicates the error rate, $\sigma_{report}$ indicates the determined temporary CQI index, and $\sigma$ indicates an arbitrary CQI index belonging to an index set.

* * * * *